Figures 1, 2:
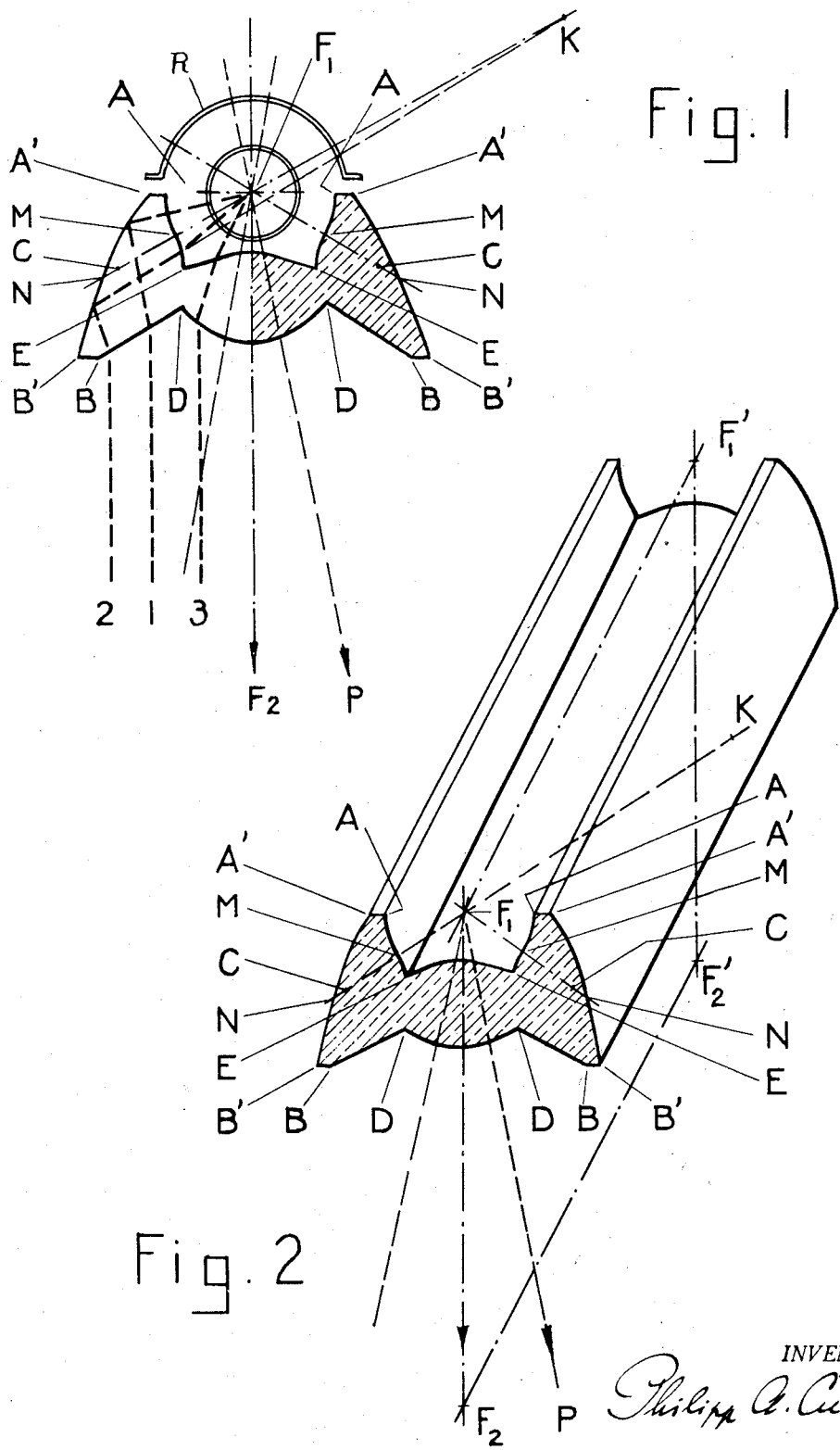

Aug. 22, 1944.  P. A. CULLMAN  2,356,654
CATADIOPTRIC LENS
Filed Dec. 19, 1942

INVENTOR.
Philipp A. Cullman

Patented Aug. 22, 1944

2,356,654

UNITED STATES PATENT OFFICE 2,356,654

CATADIOPTRIC LENS

Philipp A. Cullman, Richmond Hill, N. Y.

Application December 19, 1942, Serial No. 469,521

1 Claim. (Cl. 240—106.1)

This invention relates to optical systems, in which by way of refraction and reflection, the light rays radiated by a light source in all directions, are converted into a concentrated beam of light, and it refers more particularly to a catadioptric device; i. e., an optical system combining reflection and refraction in one arrangement.

My invention is intended for use with tubular lamps, representing a linear light source.

An object of this invention is to provide simple means of using practically the whole lightflux emanating from the light source, for producing a narrow beam of desired shape.

Since the art offers also reflectors for redirecting the light, radiated to the back of a source, this invention permits an utilization of practically the whole light flux, radiated by the light source.

A catadioptric system of my invention comprises in its central part a dioptric system, i. e., a single cylindric lens. This lens is surrounded by and formed in one piece with an outer part, representing a catadioptric system. This way the inner and outer part together will form one optical body, manufactured in one piece of the same refracting material.

The cylindric lens controls the rays passing through the central part of the body, while the remaining part of the frontward radiation of the source will be modified in its direction by the catadioptric part, surrounding the lens.

A cylindric reflector, or the like, may redirect the light radiated to the back of the light source, so that practically the total light flux of the source will be utilized to produce the desired light beam.

Fig. 1 is a cross section of a catadioptric lens according to my invention. Fig. 2 shows a prismoidal solid for use with linear light sources, having a cross section identical to that represented in Fig. 1. Using the reference characters in Figs. 1 and 2 the structural elements and their optical relation to each other will be described in the following and their function explained then separately for each figure.

In Fig. 1 the central; i. e., the dioptric part of the optical body, is the positive lens EDDE which through the incidence face EE receives light from a source, located at the primary focus $F_1$, and is designed for projection of a beam emerging from face DD with $F_2$ as secondary focus. This lens may be free of spherical aberration.

The light source at $F_1$ is surrounded in its upper hemisphere by a reflector R (only shown in Fig. 1), reflecting light rays not intercepted by the catadioptric lens.

The outer part, i. e., the catadioptric system surrounding lens EDDE, has the same primary focus $F_1$. It shows a curved outline A'B' which represents a substantially total reflecting surface, receiving light from $F_1$ through the incidence surface AE, and reflecting it into a bundle of rays directed toward a remote point P on the axis of curve A'B'. This axis is inclined to the optical axis $F_1F_2$ at an acute angle and intersecting it at $F_1$.

Surfaces as indicated by A'B' in Fig. 1, represent the precise geometrical form which an optical surface should have, in order to transmit radiant energy either by refraction or reflection accurately from one focus to the other. In optics such surfaces are referred to as "Cartesian surfaces."

The incidence surface of the outer part is represented in Fig. 1 in cross section by an S-shaped line AE. The upper half of this line, namely AM, is concentrical around $F_1$. Light rays from $F_1$, going through this part of the incidence surface, will pass substantially unaffected in transit. The lower half ME, with its center in C, represents a cylindric surface and is convex in reference to $F_1$. Light rays from $F_1$—with exception of the one going through M—will be deviated by refraction on surface ME and the refracted rays, prolongated backward, will intersect in or near the virtual image point K. This way the original divergence indicated by angle $MF_1E$ will be reduced to the smaller divergence MKE, reducing this way also the diameter B'B' and part of the height of the Cartesian surface A'B'; viz., B'N.

The point P in Fig. 1 is laying on the emersion side of the optical system and remote from $F_1$; in this case the light reflected by A'B' will form a bundle of rays directed toward P.

The incidence surface AE is optically coordinated to the Cartesian surface A'B'. The S-shaped incidence surface will therefore correspond to a surface A'B' which geometrically consists of 2 parts; namely, A'N and NB' with incidence surface AM and ME respectively. Both A'N and NB' are receiving light from $F_1$ through AE and reflecting it into a bundle of rays directed toward P, as described before.

A'B' is basically a total reflecting surface. In cases where the incident and reflected ray would form an angle smaller than the critical angle, which in certain designs may happen in the vicinity of point A', the transparent material may be provided, partly at least, with a mirror-covering along A'B' on the outside.

A'A and B'B are small surfaces along which the optical body can be fastened in a housing in the proper position to the light source and the reflector.

Light rays from $F_1$, not intercepted by the lens EDDE, are reflected by A'B', and will leave the optical body through a refracting emersion surface, represented in cross section by line BD which in its prolongation is intersecting A'B' and the optical axis. The inclination of BD is determined such way as to give the refracted rays a direction toward the secondary focus $F_2$, as shown in Fig. 1.

Fig. 1

The paths of 3 rays passing through the lens of my invention are shown in dotted lines. The 3 rays are marked at their emersion with 1, 2 and 3 respectively. Ray 1 passes the concave incidence surface AM unchanged in its original direction, is reflected by A'N, the upper part of the Cartesian surface, into a direction toward P, and refracted by the emersion surface BD toward $F_2$. Ray 2 is refracted by the convex part ME of the incidence surface, with K as virtual image of $F_1$, then reflected by NB', the lower part of the Cartesian surface, and finally refracted through BD, the same way as ray 1. Ray 3 passes through the positive lens which is designed for projection of a substantially collimated beam with $F_1$ as primary and $F_2$ as secondary focus.

Fig. 2

Fig. 2 representing a prismoidal solid which is generated by moving the section in Fig. 1 parallel to itself, shows the application of my invention to linear sources. This way focus $F_1$ of the cross section is extended to a focal line $F_1F_1'$, and analogically the secondary focus $F_2$ to a focal line $F_2F_2'$. Consequently the optical axis $F_1F_2$ is expanded into an optical plane, coincident with the principal longitudinal section. Emergent rays, as shown in Fig. 1, will represent in this case sheets of light and a reflector for redirecting the radiation of a light source, so far not collected by the incidence surfaces of the prismoidal solid, will evidently be of cylindric shape (not shown in Fig. 2). With prismoidal solids the same paths of light as shown in Fig. 1 will occur in or near the principal cross section, while for rays passing in planes between this cross section and the principal longitudinal section, refraction and reflection will be modified according to the angles of incidence, with the result, that the emergent beam, considered in and near the principal longitudinal section, will be fan-shaped and the light distribution therefore asymmetrical.

I do not wish to limit myself to the exact details of construction set forth in this specification which are given to illustrate a design of the catadioptric lens, comprehending my invention. So it will be possible for instance to design one half of the cross section for a beam of parallel rays and the other half for a beam of convergent or divergent rays, which would not noticeably alter the exterior shape of the cross section in Fig. 1. Such combinations however are representing variations in the choice of structural elements, described in the foregoing, and belong therefore to my invention; and it is obvious that departures or variations in the way of details may be made without departing from the spirit and scope of my invention which is as set forth in the following claim.

I claim as my invention:

A catadioptric lens consisting of a transparent body, in the form of a prismoidal solid, made of one piece of refracting material, a linear light source placed in the primary focal line in the principal longitudinal section of said lens, each half of the cross-section of said body being delimited by: *a*, a curved outline, representing a single and continuous internally total reflecting Cartesian surface, the axis of said outline being inclined at an acute angle to the optical axis, *b*, an S-shaped line of incidence subtending a lateral angular zone relative to said light source, and representing a refracting surface of incidence, optically coordinated to said Cartesian surface with respect to said primary focal line, said S-shaped line having its upper concave portion centered on the light source and its lower convex portion centered on a point lying within the transparent body and near the central portion of the Cartesian surface, *c*, a line of emersion, intersecting said curved outline, and representing a refracting flat surface of emersion, optically coordinated to said Cartesian surface with respect to the remote secondary focal line on the principal longitudinal section of said lens, *d*, the outlines of the incidence and emersion face of a positive cylindric lens, forming the inner part of said body, and being confocally and coaxially aligned with it, the outer part of said body being shaped for reflecting light rays from said lateral incidence surface through said emersion surface and the whole system being a confocal alignment of all said surfaces with and on the common optical plane, and being designed for collecting the light flux radiated by said light source within a solid angle of near 180 degrees and concentrating it into a continuous asymmetric beam of rays, parallel to said primary focal line, and meeting in said remote secondary focal line.

PHILIPP A. CULLMAN.